D. H. BELLAMORE AND T. I. S. BOAK.
METHOD OF MAKING PISTON PINS.
APPLICATION FILED AUG. 22, 1919.
1,385,357.
Patented July 26, 1921.
2 SHEETS—SHEET 1.
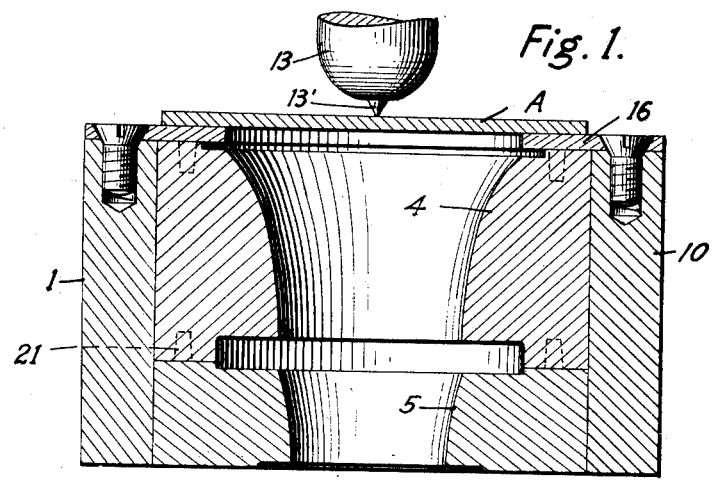
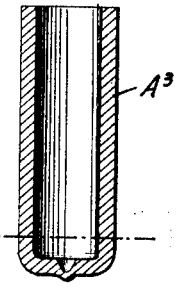
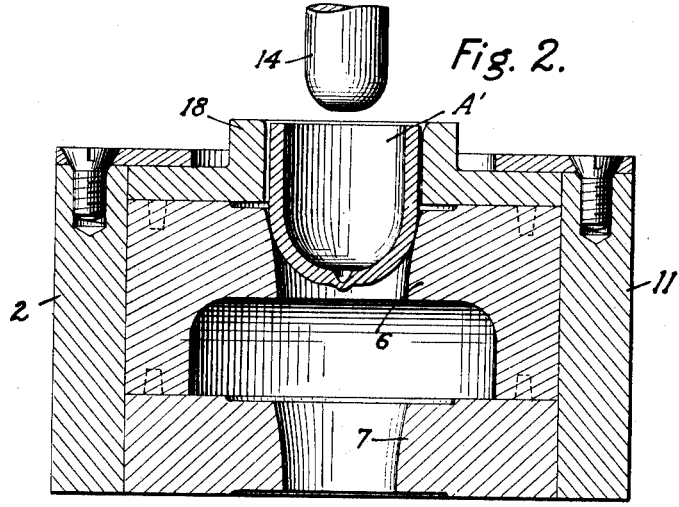
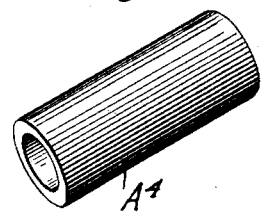
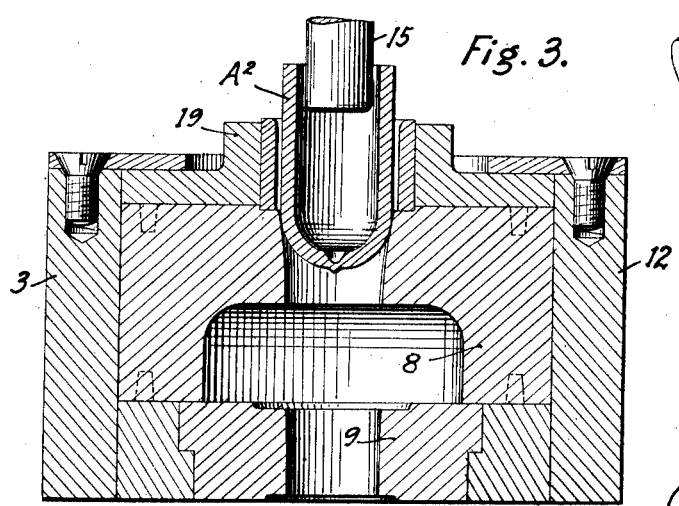
Inventor
David H. Bellamore
Thomas I. S. Boak
Jas. H. Griffin
Attorney

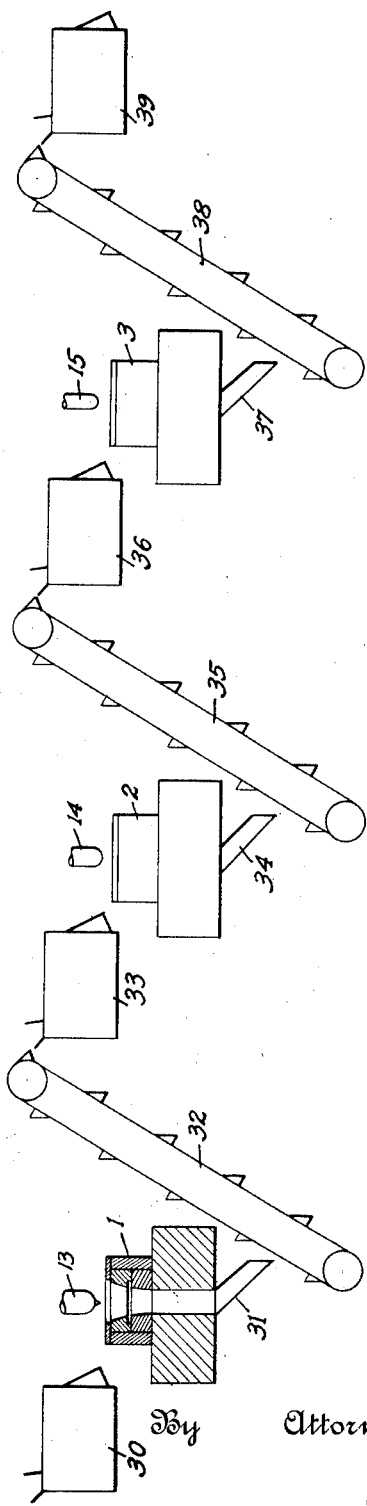

UNITED STATES PATENT OFFICE.

DAVID H. BELLAMORE, OF NEW YORK, N. Y., AND THOMAS I. S. BOAK, OF EAST ORANGE, NEW JERSEY, ASSIGNORS TO STANDARD ORDNANCE CORPORATION, OF NEW YORK, N. Y., A CORPORATION OF NEW YORK.

METHOD OF MAKING PISTON-PINS.

1,385,357.   Specification of Letters Patent.   Patented July 26, 1921.

Application filed August 22, 1919. Serial No. 319,130.

*To all whom it may concern:*

Be it known that we, DAVID H. BELLAMORE, a subject of the King of Great Britain, residing in the city of New York, borough of Manhattan, county and State of New York, and THOMAS I. S. BOAK, a citizen of the United States, residing at East Orange, county of Essex, and State of New Jersey, have invented a certain new and useful Method of Making Piston-Pins, of which the following is a specification.

This invention relates to piston pins which are employed to pivotally secure the connecting rod to the piston of an internal combustion engine, and the present invention is more particularly directed to a method of producing the same.

In piston pins as heretofore made, the pin is either made solid and its center bored out, or the pin is cut from the length of drawn steel tubing, and in either event, the pin is case-hardened to secure a hard bearing surface for the connecting rod. The case-hardening process is so carried out that merely a surface hardening of the pin results, which surface hardening does not extend for any appreciable distance into the pin, but leaves the interior portions thereof relatively soft.

The object of this practice is to provide a pin with surface hardness, but interior strength. When a pin of this character is subjected to wear, the surface hardening thereof wears thin after a comparatively short time, and not infrequently portions thereof check off, with the result that not only the bearing is damaged, but that the soft inner material of the pin is required to take the wear. The pin then wears rapidly and "knocks" due to a loose bearing quickly developing.

Furthermore, in pins made of drawn tubing, the thickness of the walls is not uniform, as it is practically impossible to draw tubing uniformly. As a result, the strength of the pin is not uniform throughout, nor is the expansion of such pin under the heat of friction uniform, so that a pin formed by cutting off a length of drawn steel tubing has been found impractical for the uses specified.

One of the most important features in motors is to obtain proper balance and this is particularly the case in motors having a plurality of cylinders. In order to obtain proper balance, it is essential that all of the corresponding movable parts of the several cylinders be of the same weight, otherwise the balance will not be true, and vibration will result. When pistons pins are constructed from drawn steel tubing or made solid and bored out as described, it is found to be practically impossible to make all of the pins by either method of perfectly uniform weight, and it is accordingly the practice in factories where motors are built, to weigh all of the movable parts individually, and then segregate them according to their weights, a slight variation in which is allowed in each particular segregated group. When any particular motor is being set up, the movable parts are drawn from the respective groups of segregated parts so that resulting motor will be as nearly balanced as practical, and will be free from vibration.

With the foregoing considerations in mind, the object of the present invention is to provide a highly efficient method of fabricating such a pin, by the passing thereof through a minimum number of operations which allows of the production of the pin in a commercially expeditious manner.

In the preferred manner of carrying out the process of this invention a sheet metal piece possessing the proper properties is cut in the form of a circular disk, and after being heated to a predetermined temperature, is manipulated to partake of the form of a cup. At the conclusion of the cupping operation, a plurality of drawing operations on the cup are carried out, and intermediate each two successive drawing operations the blank is heat treated to facilitate the carrying out of these operations. Through the operations described, the shape of the blank is changed from that of the flat to that of successively smaller, but longer tubular shapes, until at the conclusion of the final operation, the resulting tubular shape is substantially the proper diameter of the proposed pin, but of excessive length and closed at one end. The tubular shape thus formed is preferably now subjected to heat treatment for the purpose of normalizing the material thereof after which it is cut to the proper length and the required oil holes or other necessary machining accomplished thereon. The pin is now hardened and tempered, and, as a final operation, the pin is trued up and calipered, and the surface scale ground off in order that the pin may have a finished surface and be of the required diameter.

The material employed in the making of the pin of this invention is alloy steel which allows of the manufacture of a lighter pin than heretofore made from drawn steel tubing or solid steel machined out, particularly, on account of the alloy steel possessing higher qualities of strength and permitting of uniform heat treatment throughout the structure. In other words, instead of case-hardening or carbonizing ordinary machine steel, and securing merely a surface hardening for the bearings, the practising of this invention results in uniform hardness throughout the entire body of the pin, which, with the added strength of the alloy steel, results in the production of a much lighter and stronger pin than has heretofore been possible to make through the employment of old methods, even at the sacrifice of weight considerations. A pin constructed as described will not check through use, will wear uniformly, as well as heat uniformly, so that unequal expansion and undistributed wear on the bearings are avoided.

In the preferred manner of practising the invention, the material is preferably worked in a heated condition, the temperature of which will be governed by the particular properties of steel employed, and novel laminated dies are preferably used, since through their coöperation, the formation of the pin is expedited, and the number of operations required in the formation of the finished pin from the original blank minimized.

Features of the invention other than those specified will be apparent from the hereinafter detailed description taken in conjunction with the accompanying drawings.

In the accompanying drawings we have illustrated one practical embodiment of the invention, but the construction therein shown is to be understood as illustrative only, and not as defining the limits of the invention.

Figures 1, 2 and 3 are sections of die couples through which the blank is successively passed by plungers shown in elevation in each figure;

Fig. 4 is a central section of the blank as it comes from the last die couple;

Fig. 5 shows the finished pin in perspective; and

Fig. 6 is a diagrammatic showing for the consecutive steps preferably involved in carrying out the method of this invention.

Referring to the drawings, 1, 2 and 3 each designate die couples, each of which is of laminated form. The die couple 1 embodies an upper section 4 and lower section 5; the die couple 2 embodies an upper section 6 and lower section 7; and die couple 3 consists of an upper section 8 and lower section 9. The upper and lower sections of the respective couples are maintained in coöperative alined relation by die holders 10, 11 and 12, in which the respective sections are positioned for the purpose of holding them rigidly together, and with the respective couples are associated punchers or plungers 13, 14 and 15 by means of which the material to be manipulated is forced through the respective dies. Each of the die couples 1, 2 and 3 has, moreover, associated therewith blank holding plates 16, 18 and 19, respectively, for supporting the blank in positions to be operated on by the several plungers in succession.

The stock from which the pins are to be formed comes in strips or sheets which are first stamped out into the form of disks A, circular in contour and of such diameter as is required for the formation of the pin. The material used is alloy steel, preferably chrome vanadium steel, although a high carbon steel, chrome nickel or silicon nickel steel may be employed. The method of manipulating the blanks cut from this material will now be described step by step and it will be shown how each blank is successively treated to form the piston pin of this invention.

The blank after being stamped into the form of a disk is heated to the desired temperature, which will vary in accordance with the properties of the steel, but for chrome vanadium steel the temperature may be around 1400° F. The heated blank is positioned upon the supporting plate 16 as shown at A in Fig. 1, whereupon the plunger 13 is caused to descend and operates upon the blank A to force it downwardly through the upper die section 4 to impart to said blank a cup-shaped configuration, whence, by a continued operation of the plunger 13 this cupped blank is forced downwardly through the lower section 5 of the couple 1. In order to centralize the blank during this operation, the plunger 13 is provided with sharpened prong 13′ adapted to impale the blank at its center and cause it to be uniformly wiped down through the die. Neither of the plungers 14 or 15 is provided with means for impaling and centralizing the blank, since, after the initial cupping operation, the blank automatically centralizes itself.

The blank, which leaves the section 5 in the shape of a cup, as shown in Fig. 2 at A′, is removed from the plunger and subjected to a heat treatment during which its temperature is raised substantially to that of the first heating for the purpose of imparting the required ductility to the material for the next operation. When the desired temperature of the cupped blank is attained, said blank is placed in coöperative relation to the die couple 2, the upper portion of which is provided with the blank holder 18, adapted to receive the cup, as shown, and support it in position to be operated upon by the coöperating plunger 14. The plunger 14 is immediately lowered and successively forces the blank A' through the upper and lower sections 6 and 7 of the die couple 2, during which operation the cup-shaped blank is lengthened out and its diameter reduced.

After leaving the die couple 2, the blank, which has assumed the shape shown at $A^2$, is again heat treated to raise its temperature as before for the purpose of again imparting the required ductility, and at the conclusion of the heating process, it is positioned in coöperative relation to the die couple 3, being held in such position by the blank holder 19, forming a part thereof. The plunger 15, associated with die couple 3 is lowered and forces the blank through the upper and lower sections 8 and 9 of said couple during which operation the length of the blank is further increased and its diameter diminished. It will of course be understood that in the carrying out of these successive operations, the die sections through which the blank is successively passed are of successively diminishing sizes, and the respective plungers by which the blank is forced through the dies are of corresponding proportions so that through the successive manipulations of the blank said blank is, in every step, after being cupped and formed into a cylindrical shape, lengthened parallel to its axis, and its diameter reduced so that after it has been passed through the laminated die couple 3, it comes from said die couple in the substantially finished diameter shown at $A^3$, having been lengthened out to the requisite length, and having substantially the correct diameter.

The blank $A^3$ is now heated to the normalizing temperature required for its particular constituents, and is maintained at this temperature for a sufficient period to allow the properties of the steel to return to their normal conditions, after which the blank is removed from the fire and subjected to a slow cooling operation. In order that the cooling may be slow and uniform throughout, the blank is preferably packed or embedded in lime or any other suitable material. When cooled, the material of the blank is in a soft normal condition which allows of its working for the purpose of finishing and truing up the same.

The open end of the blank is next squared off, after which the blank is cut to length, during which operation the closed end is cut off as on the line 20 of Fig. 4. Such machining as may be necessary for the formation of oil grooves, pin holes, etc., is now accomplished while the pin is in the softened condition.

The machine work having been concluded, the blank $A^3$ is again subjected to heat treatment, and after being raised to the desired temperature, it is instantly quenched for the purpose of hardening, and in this hardened condition, it is placed in oil or any other tempering medium, depending upon the constituents of the material The temperature of the oil or other tempering medium is raised to the desired degree, depending upon the chemical characteristics of the steel, and is maintained at this temperature for the desired period, after which the blank is removed and allowed to cool.

The blank, in its hardened and tempered condition, is now ready for the final operation which consists in grinding off or otherwise removing the surface scale and imparting to the surface of the pin a finished condition, as well as rendering the pin of the proper diameter. The resulting pin is as shown at $A^4$ in Fig. 5.

By the foregoing method either an extremely hard pin may be formed, or one of less hardness, depending entirely upon the material used, the temperatures to which the pin is subjected, and the processes followed in cooling the same. In any event, a pin formed from flat disks or blanks of alloy steel by the practising of the foregoing method is much lighter than those heretofore employed and correspondingly stronger. This is not only due to the material employed, but to the fact that the material is "worked", which experiment has proven, imparts greater strength to the pin. Furthermore, through the manipulation of the material in the manner described, the walls of the pin are formed of uniform thickness which not only imparts uniform strength thereto, but obviates the objection of irregular heating and expansion during the use of the pin. It will be manifest that all pins operated upon in the manner described will be of the same identical weight, and, accordingly, sorting of the pins for correct balancing is entirely unnecessary.

The construction of the dies and their assembly in couples has a great deal to do with the commercial success of the manufacturing process described. Through the employment of what we term "laminated dies", the working of the material is expedited, and the necessity for frequent heatings obviated. The die operations are cut down to three distinct steps through the employment of these die couples, whereas, if they were not employed, at least six or seven would be essential. As practised, the carrying out of the invention with laminated dies allows of two or more forming operations on the blank each time the blank is passed through one of the die couples. In passing the blank through the dies as described, the first and second couples have a distinct wiping action, the plungers of said couples serving to wipe the blank down through the dies, but in the passage of the blank through the third couple, the action is more of a drawing action, during which the metal is worked and its thickness rendered uniform throughout those portions which are to subsequently form the pin. It has been found by experiment that the working of the metal as described enhances its strength, and enables it to better withstand the wear and tear of use.

In the dies as shown in Figs. 1, 2 and 3, the die sections are supported within the die holders which are, in practice, secured by clamps to the bolster of the press, and are in this manner supported or held together in co-axial relation. The die sections may moreover be doweled together by dowels 21 as shown, and when these dowels are employed, the die holders 10, 11 and 12 may be omitted as the dowels will hold the sections in proper alinement. In the die couples of Figs. 1 and 2, and the upper die section of Fig. 3, the die sections are shown in one piece, but it will be noted that the lower die section of Fig. 3 is in two parts. In practice, this construction has been found to be highly advantageous, since the section itself may be made from cast iron while the bushing, which receives the real wear and pressure, may be formed from hardened tool steel. This allows of great economy, and, if desired, all of the die sections may be so formed.

In Fig. 6 of the drawings, there are shown, diagrammatically, the consecutive steps through which the pin of the present invention is passed, in the preferred manner of practising the invention. The blank after having been stamped up or otherwise formed from a sheet of metal is introduced into a heating furnace 30 and is raised to the desired temperature to render it ductile after which it is removed from the furnace and placed in coöperative relation with the die couple 1. The plunger 13 is then lowered and forces the die through couple 1 in the manner hereinbefore described. After passing through the couple 1, the partly formed blank is fed through a chute 31 to an endless conveyer 32 which delivers it into the second heating furnace 33. After being reheated, the blank is transferred from the heating furnace to die couple 2, is acted upon by the plunger 14 and thereafter delivered through a chute 34 to the endless conveyer 35, which deposits it in the third furnace 36. The pin after being again heated is placed in coöperative relation with the die couple 3 and is forced by the plunger 15 through said die couple and into the chute 37. From the chute 37 the pin is picked up by the endless conveyer 38 and deposited in the furnace 39 in which the normalizing operation is carried out. The pin after coming from the normalizing furnace 39 is subjected to the remaining steps in its construction in the manner hereinbefore described.

It will be noted that through the handling of the pin through its several operations, particularly those of heating and passing the blank through the dies in succession, the steps are so mechanically carried out that the pin is not allowed to cool, but is transferred directly from one die to a furnace and directly from the furnace to the die. The operations are substantially continuous so that the loss of heat is obviated and great economy results from the carrying out of the method in the manner set forth.

Having thus fully described the invention, what we claim as new, and desire to secure by Letters Patent is:

1. The process of making piston pins from a flat blank which consists in consecutively forcing said blank through dies of successively diminishing sizes to impart an elongated cylindrical form thereto, and thereafter hardening and tempering the cylindrical blank thus formed and finishing the surface thereof.

2. The process of making piston pins from a flat blank which consists in consecutively forcing said blank through a plurality of dies of successively diminishing sizes to cup said blank and impart an elongated cylindrical form thereto, thereafter hardening and tempering the blank, cutting the thus formed cylindrical blank to length, and finishing the surface thereof.

3. The process of making piston pins which consists in heating a flat blank of metal, forcing the heated blank consecutively through dies of successively diminishing sizes to impart an elongated cylindrical form thereto, re-heating the blank periodically during such operations to maintain its ductility, hardening and tempering the cylindrical blank thus formed, cutting the blank to length, and surfacing the resulting pin.

4. The method of making piston pins from a flat blank of material which consists in forcing the blank through a die to impart to it a cup-shaped form, thereafter passing the blank through successive dies of diminishing sizes to decrease its diameter and increase its length, hardening and tempering said blank, then cutting the blank to length, and finishing the surface of the resulting pin.

5. The method of making a piston pin from a flat blank of material which consists in heating the blank to render it more ductile, forcing the heated blank through a die to impart to it a cup-shaped form, re-heating the blank, and then passing it through another die to impart an elongated cylindrical form thereto, subjecting the cylindrical blank thus formed to further alternate heating and drawing operations until the blank is of the desired diameter, thereafter cutting the cylindrical blank to length, hardening and tempering said blank and finishing its surface.

6. The method of making a piston pin from a flat blank of material which consists in heating the blank, drawing it into elongated cylindrical form, and repeating the drawing operation with alternate heating operations until the cylindrical blank is of the desired diameter, thereafter cutting the blank to length, heating and tempering the same, and finishing the surface of the pin thus formed.

7. The method of making a piston pin from a flat blank of material which consists in heating the blank, forcing it through a die and delivering it from the die into a reheating furnace, so that the cooling of the pin is obviated, repeating these steps until the blank has been brought to the desired shape and size, and thereafter hardening and tempering the pin.

8. The method of making a piston pin from a flat blank of material which consists in effecting the shaping of the flat blank into an elongated tubular form by the passing of the blank through a plurality of dies in succession.

9. The method of making a piston pin from a flat blank of material which consists in subjecting the blank to a wiping action for the purpose of imparting thereto an elongated cylindrical form, and thereafter imparting a drawing action to the blank for imparting thereto uniform thickness throughout.

In testimony whereof we have signed our names to this specification.

DAVID H. BELLAMORE.
THOMAS I. S. BOAK.